(12) United States Patent
Goll et al.

(10) Patent No.: US 10,113,566 B2
(45) Date of Patent: Oct. 30, 2018

(54) HYDRAULIC VALVE IN PARTICULAR CARTRIDGE VALVE

(71) Applicant: Hilite Germany GmbH, Marktheidenfeld (DE)

(72) Inventors: Juergen Goll, Collenberg (DE); Andre Seidenschwann, Erlensee (DE)

(73) Assignee: Hilite Germany GmbH, Marktheidenfeld (DE)

( * ) Notice: Subject to any disclaimer, the term of this patent is extended or adjusted under 35 U.S.C. 154(b) by 40 days.

(21) Appl. No.: 15/176,331

(22) Filed: Jun. 8, 2016

(65) Prior Publication Data

US 2017/0152870 A1     Jun. 1, 2017

(30) Foreign Application Priority Data

Jul. 9, 2015   (DE) .................. 10 2015 111 157

(51) Int. Cl.
| | | |
|---|---|---|
| F15B 13/04 | (2006.01) | |
| F16K 27/04 | (2006.01) | |
| F16K 31/06 | (2006.01) | |
| F15B 13/044 | (2006.01) | |
| F15B 21/04 | (2006.01) | |

(52) U.S. Cl.
CPC ........ F15B 13/0402 (2013.01); F15B 13/044 (2013.01); F15B 21/041 (2013.01); F16K 27/041 (2013.01); F16K 27/048 (2013.01); F16K 31/0613 (2013.01)

(58) Field of Classification Search
CPC .......... Y10T 137/794; Y10T 137/8122; B01D 35/30; B01D 29/31; B01D 29/05; F15B 13/0402; F15B 13/044; F15B 21/041

USPC .................. 137/544, 550; 210/485, 495
See application file for complete search history.

(56) References Cited

U.S. PATENT DOCUMENTS

| | | | |
|---|---|---|---|
| 5,247,965 A | 9/1993 | Oka et al. | |
| 7,000,633 B2 * | 2/2006 | Okada | F01M 11/03 |
| | | | 137/549 |
| 7,896,026 B2 * | 3/2011 | Choi | B62D 5/062 |
| | | | 137/550 |

(Continued)

FOREIGN PATENT DOCUMENTS

| | | |
|---|---|---|
| CN | 103670565 A | 3/2014 |
| CN | 104633177 A | 5/2015 |

(Continued)

*Primary Examiner* — Jessica Cahill
(74) *Attorney, Agent, or Firm* — Von Rohrscheidt Patents

(57) ABSTRACT

A hydraulic valve, in particular a cartridge valve including a valve piston that is supported axially movable in a valve bushing and by which at least one operating connection, advantageously two operating connections are alternatively connectable with a supply connection and a tank drain, wherein the connections are configured with respect to a longitudinal axis of the valve bushing as slotted holes that extend over a limited distance in a circumferential direction and which are respectively protected by a screen element configured as a metal band which covers the slotted hole with a filter portion, wherein the screen element is arranged in a first groove enveloping the slotted hole and envelops the valve bushing in a second groove originating from the first groove on two sides, characterized in that the screen element includes a filter mask which includes a welding portion at a first end.

11 Claims, 5 Drawing Sheets

(56) References Cited

U.S. PATENT DOCUMENTS

| | | | |
|---|---|---|---|
| 7,905,248 B2* | 3/2011 | Yoshida | F16K 31/0613 137/550 |
| 2003/0139271 A1* | 7/2003 | Vangedal-Nielsen | B65D 31/145 493/162 |
| 2005/0011703 A1* | 1/2005 | Yamaguchi | F01L 1/344 184/6.9 |
| 2006/0021933 A1* | 2/2006 | Radcliffe | B01D 29/018 210/483 |
| 2008/0072975 A1 | 3/2008 | Sugiura | |
| 2013/0048112 A1* | 2/2013 | Nemoto | F16K 31/0613 137/544 |
| 2015/0129059 A1 | 5/2015 | Okada et al. | |
| 2015/0233481 A1* | 8/2015 | Shimura | F16K 27/048 137/549 |

FOREIGN PATENT DOCUMENTS

| | | |
|---|---|---|
| DE | 19510647 C1 | 2/1996 |
| DE | 102011002150 | 10/2012 |
| DE | 102011002150 A1 | 10/2012 |
| DE | 102012215134 | 2/2013 |
| DE | 102013217984 A1 | 5/2014 |
| EP | 1921359 A1 | 5/2008 |
| JP | 2006022816 | 1/2006 |
| JP | 4183700 | 11/2008 |
| WO | WO2015037351 A1 | 3/2015 |

\* cited by examiner

HYDRAULIC VALVE IN PARTICULAR CARTRIDGE VALVE

RELATED APPLICATIONS

This application claims priority from and incorporates by reference German Patent Application DE 10 2015 111 157.8 filed on Jul. 9, 2015.

FIELD OF THE INVENTION

The invention relates to hydraulic valve, in particular a cartridge valve including a valve piston which is supported axially movable in a valve bushing and which facilitates connecting at least one operating connection, advantageously two operating connections alternatively with a supply connection or a tank drain, wherein the connections are configured as slotted holes extending over a defined distance with respect to a longitudinal axis of the valve bushing in a circumferential direction and wherein the connections are respectively protected by a screen element configured as a metal band which covers the longitudinal hole with a filter portion wherein the screen element is arranged in a first groove enveloping the slotted hole and envelops the valve bushing in a second groove which extends on two sides from the first groove.

BACKGROUND OF THE INVENTION

U.S. Pat. No. 5,247,965 shows a cartridge valve for an automatic transmission, the cartridge valve including an hydraulic bushing which includes plural connection openings which are configured as slotted holes extending over a defined distance in a circumferential direction. In order to prevent that contaminant particles cause the cartridge valve to seize a lower portion is provided in the hydraulic bushing where contaminant particles, like steel powder sink due to their weight. The cartridge valve is suitable for a directionally oriented installation since the slotted holes do not envelop an entire circumference of the hydraulic bushing, so that bore holes in a housing receiving the cartridge valve can originate directly from the slotted hole.

DE 195 10 647 C1 discloses another cartridge valve. This cartridge valve includes two supply connections P, an operating connection A and a tank drain T. Respective inserts are inserted into the supply connection P and the operating connection A.

A hydraulic valve of this general type can be derived from DE 10 2011 002 150 A1. A screen insert described herein is configured as a metal band with integrally formed support bands wherein ends of the support bands that are distal from the screen insert overlap each other and are spot welded together.

BRIEF SUMMARY OF THE INVENTION

Thus, it is an object of the invention to provide an axially short hydraulic valve which is protected against contaminant particles and producible in a simple and cost effective manner.

The object is achieved according to the invention by a hydraulic valve, in particular a cartridge valve including a valve piston that is supported axially movable in a valve bushing and by which at least one operating connection, advantageously two operating connections are alternatively connectable with a supply connection and a tank drain, wherein the connections are configured with respect to a longitudinal axis of the valve bushing as slotted holes that extend over a limited distance in a circumferential direction and which are respectively protected by a screen element configured as a metal band which covers the slotted hole with a filter portion, wherein the screen element is arranged in a first groove enveloping the slotted hole and envelops the valve bushing in a second groove originating from the first groove on two sides, characterized in that the screen element includes a filter mask which includes a welding portion at a first end, wherein the welding portion is arranged in a groove portion outside of the slotted hole and a support band extends from a second end of the filter mask, wherein the support band is arranged in the second groove and envelops the valve bushing, and wherein an end portion of the support band at least partially covers the weld portion of the filter mask and is welded together with the weld portion.

According to the invention the screen element includes a filter mask which includes a welding portion at a first end, wherein the welding portion is arranged in a groove portion outside of the slotted hole and a support band extends from a second end of the filter mask wherein the support band is arranged in the second groove and envelops the valve bushing and wherein an end portion of the support band at least partially covers a welding portion of the filter mask and is welded together with the welding portion. The welding portion arranged in the filter mask facilitates configuring the screen element and the valve bushing in a simpler manner while facilitating a reliable weld. Furthermore arranging the weld in a portion of the filter mask facilitates configuring the slotted holes and the grooves with a very small distance which helps to provide the hydraulic valve axially very short.

BRIEF DESCRIPTION OF THE DRAWINGS

Further advantages, features and details of the invention can be derived from the subsequent description of an advantageous embodiment and from the drawing figures. The features and feature combinations recited in the preceding description and the features and feature combinations recited in the subsequent figure description and/or individually shown in the figures are not only useable in the respectively recited combination but also in other combinations or by themselves without extending beyond the scope and spirit of the invention. Identical or functionally equivalent elements have identical reference numerals. For reasons of clarity the elements may not be provided with their respective numerals in all figures without loosing their association. The invention is subsequently described based on an embodiment with reference to drawing figures, wherein.

DETAILED DESCRIPTION OF THE INVENTION

Figure 1:
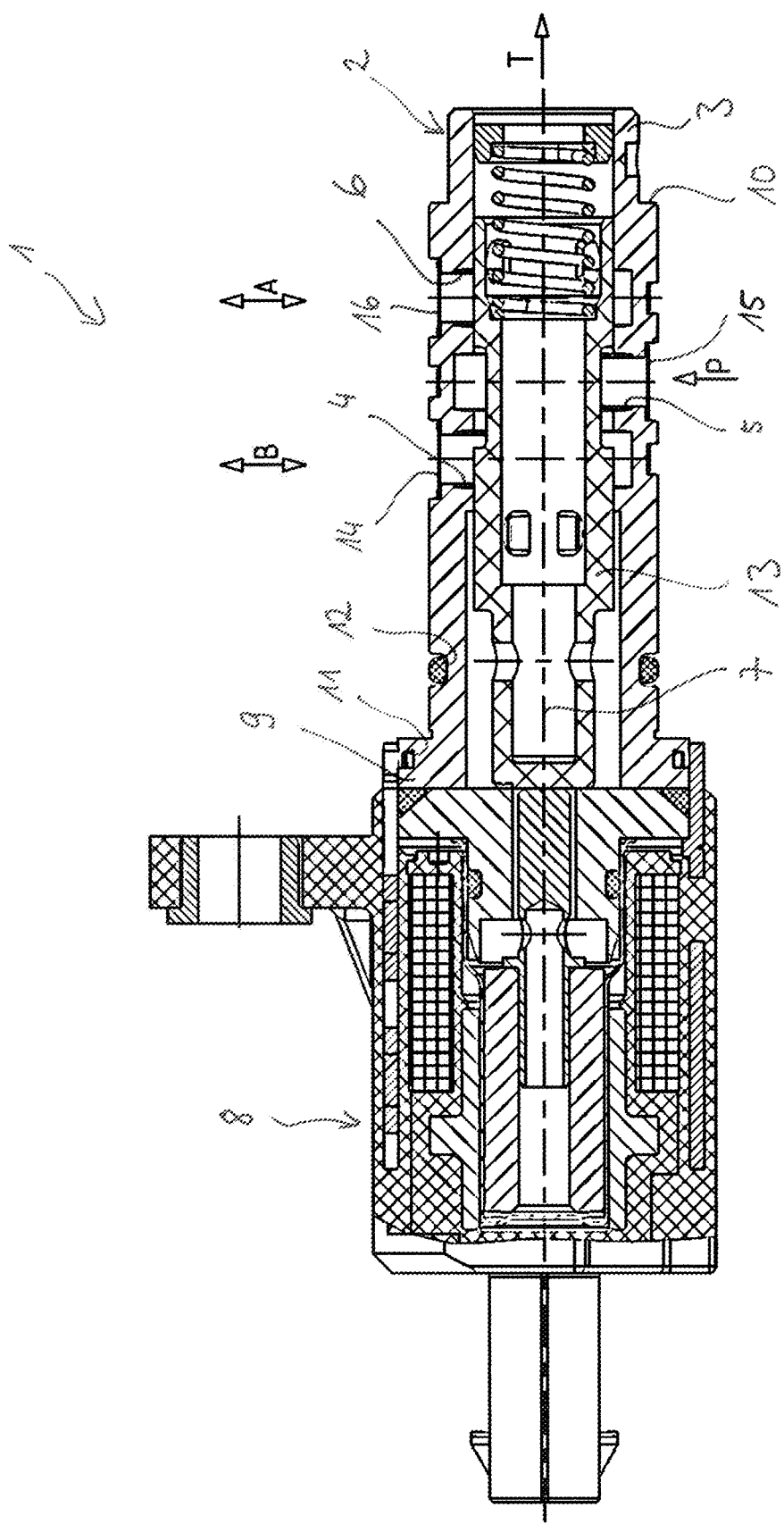
FIG. 1 illustrates a hydraulic valve according to the invention in a longitudinal sectional view.

FIG. 1 illustrates a hydraulic valve according to the invention in a longitudinal sectional view which hydraulic valve is provided in particular as a cartridge valve with a hydraulic portion 2.

The hydraulic portion 2 includes a valve bushing 3 with circumferentially oriented slotted holes 4, 5, 6 extending over a defined length in a circumferential direction. The three slotted holes 4, 5, 6 are arranged in axial sequence with respect to a longitudinal axis 7 of the valve bushing 3 and represent the subsequently described connections. The valve bushing 3 thus includes an annular boss 9 at an end that is proximal to an electromagnetic actuator 8 wherein the annular boss is configured for attachment and extends in a radially outward direction. At the other end the valve bushing 3 is reduced in diameter by a shoulder 10. The first end includes a circumferential annular groove 11 at the annular boss 9 for receiving a seal element. Between the annular boss 9 and the slotted holes 4, 5, 6 an additional circumferential groove 12 is provided into which an O-ring is inserted when the cartridge valve is mounted wherein the O-ring seals connections in outward direction towards a housing that is not illustrated in more detail. Thus, a first connection is a supply connection P which is axially centrally arranged with respect to the longitudinal axis 7 between two operating connections A, B. The two operating connections A, B are arranged with respect to the longitudinal axis 7 on a side of the valve bushing 3 that is opposite to the supply connection P.

The supply P is used for supplying the hydraulic portion 2 with the hydraulic fluid. The two operating connections A, B are hydraulically connectable with chambers of a hydraulically controlled device, e.g. a cam phaser of a cam shaft. According to the positioning of the a valve piston 13 that is received axially moveable in the valve bushing 3 the operating connections A, B are either blocked, pressure loaded through the supply connection P, or relieved towards a tank through a tank drain T.

Figure 4:
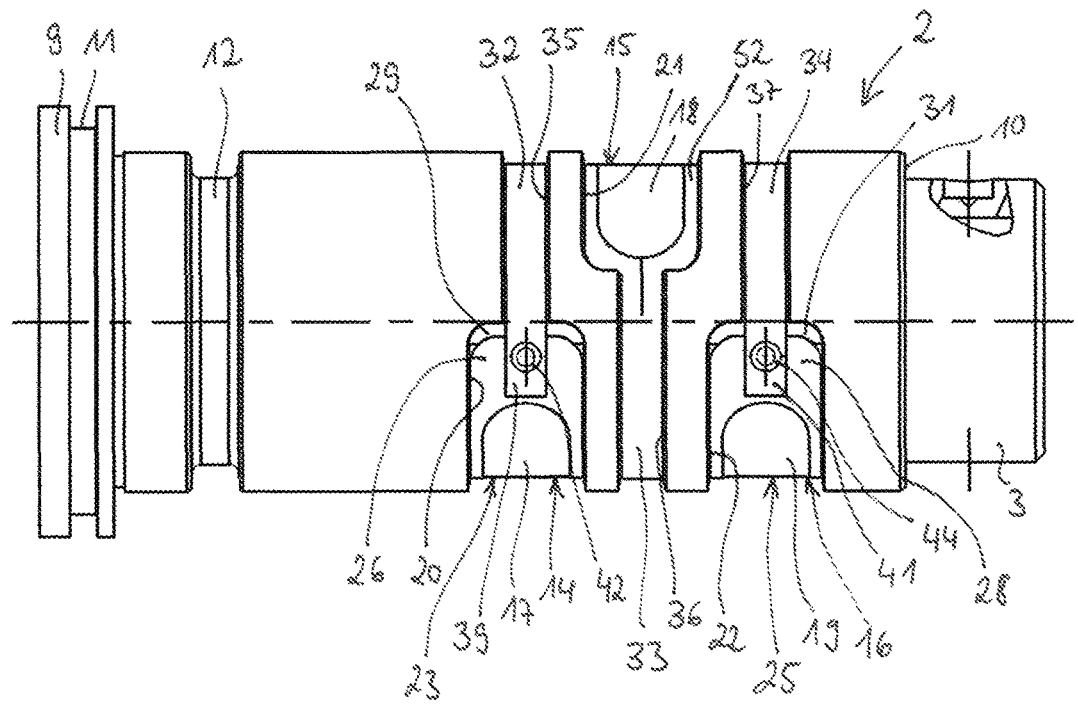
FIG. 4 illustrates a side view of the hydraulic component of the hydraulic valve according to the invention according to FIG. 1.
Figure 5:
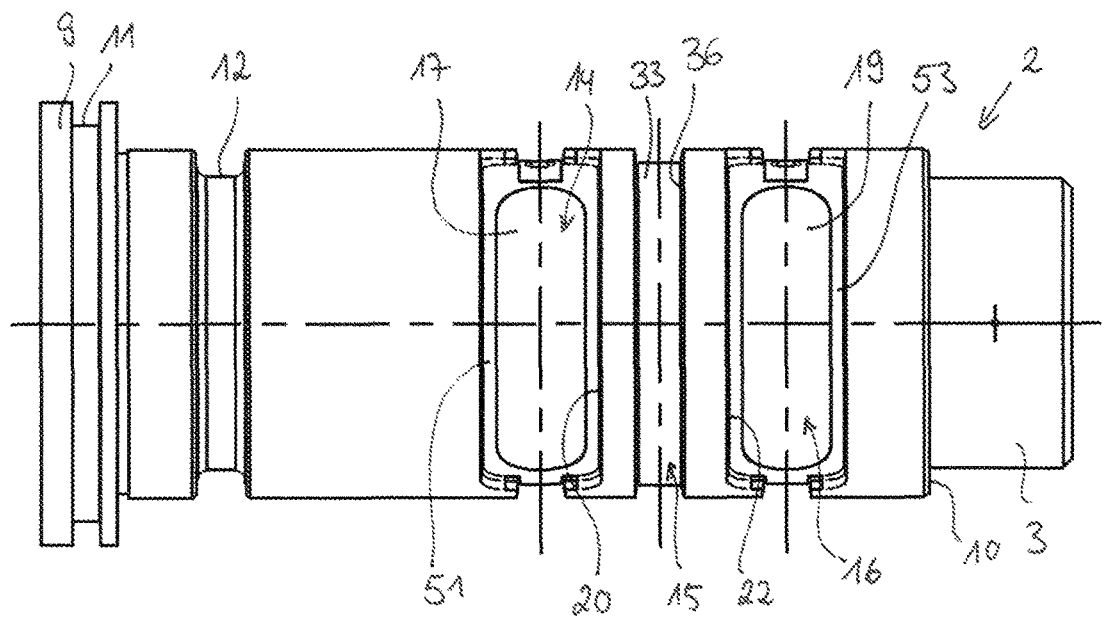
FIG. 5 illustrates a top view of the hydraulic portion of the hydraulic valve according to the invention according to FIG. 1.
Figure 6:
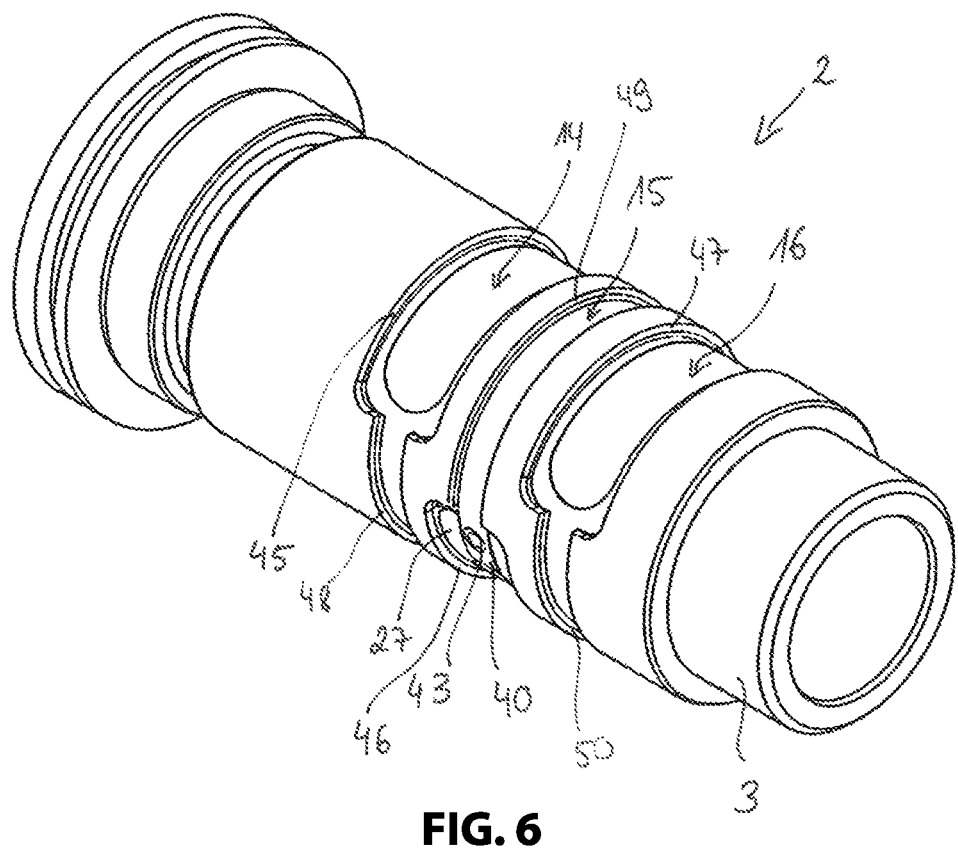
FIG. 6 illustrates a perspective view of the hydraulic portion of the hydraulic valve according to the invention according to FIG. 1.

FIGS. 4, 5 and 6 illustrate the hydraulic portion 2 of the hydraulic valve according to the invention in various perspectives. It is evident that the slotted holes 4, 5, 6 are respectively protected by a screen element 14, 15, 16 configured as a metal band, wherein the screen element covers the slotted hole 4, 5, 6 with a filter portion 17, 18, 19. The screen elements 14, 15 16 and the three slotted holes 4, 5, 6 are thus configured identical.

Figure 2:
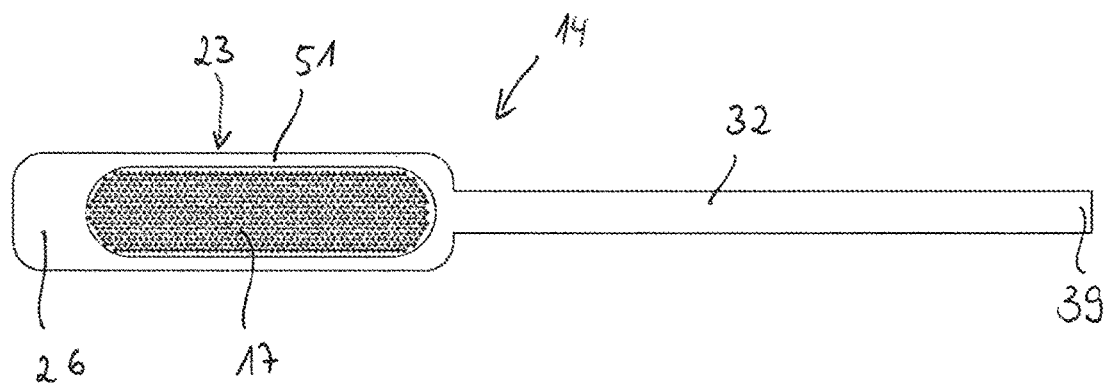
FIG. 2 illustrates a screen element of the hydraulic valve according to FIG. 1 in a top view.
Figure 3:
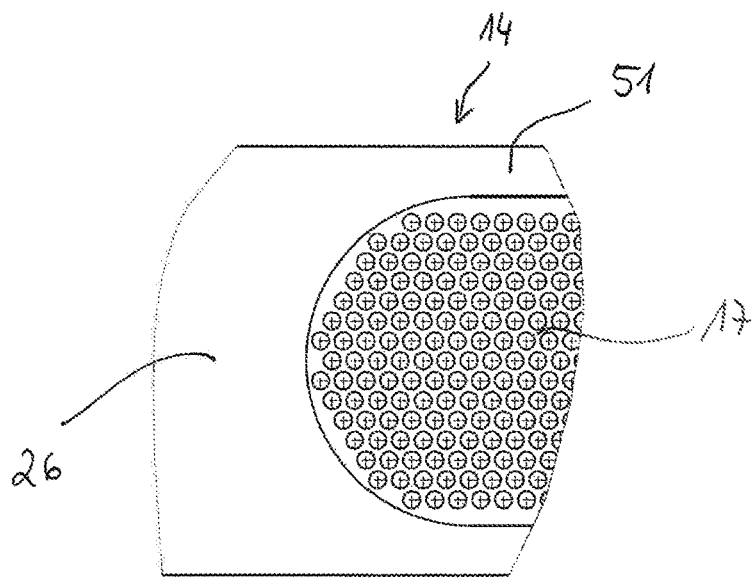
FIG. 3 illustrates a blown up representation of a detail of the screen element according to FIG. 2.

As can be derived in particular from FIG. 4 each screen element 14, 15, 16 is arranged in a first groove 20, 21, 22 enveloping the slotted hole 4, 5, 6. The screen element 14 illustrated in FIGS. 2 and 3 in an exemplary manner includes a filter mask 23 with identical width which includes a welding portion 26 at a first end wherein the welding portion is arranged axially adjacent to the filter portion 17 covering the slotted hole 4. This welding portion 26 is arranged in a groove portion 29 outside of the slotted hole 4. A support band 32 that is provided narrow compared to the filter mask 23 extends from a second end of the filter mask 23 is arranged in a second groove 35 and envelopes the valve bushing 3. The second groove 35 extends from the first groove 20 on two sides in a circumferential direction so that an end portion 39 of the support band 32 partially covers the welding portion 26 of the filter mask 23 so that it is weldable with the welding portion 26 after the screen element 14 is mounted into the valve bushing 3. The described screen elements 14, 15, 16 are producible in a simple and cost effective manner like the valve bushing 3 which is for example configured as a turned component. Thus, the first groove 21, 22, 23 is provided milled and the second groove 35, 36, 37 is provided turned.

An optimum transition between the first groove 20, 21, 22 and the second groove 35, 36, 37 is obtained in that the second groove 35, 36, 37 has a greater diameter than the first groove 20, 21, 22 so that a continuous and/or tangential transition is provided between the two grooves 20, 21, 22, 35, 36, 37. Thus, the screen element 14, 15, 16 contacts the valve bushing 3 securely without a gap being created.

The end portion 39, 40, 41 of the support band 32, 33, 34 can be arranged on or alternatively below the weld portion 26, 27 28 and can be welded thereon. According to the illustrated embodiment the end portion 39, 40, 41 of the support band 32, 33, 34 is arranged on the weld portion 26, 27 28 and welded thereon. For this purpose the end portion 39, 40, 41 is supported in position by a non-illustrated down holder during the welding process. This arrangement of the end portion 39, 40, 41 facilitates in a simple manner that the screen element 14, 15, 16 is applicable to the valve bushing 3 without any problem without generating a gap through which contaminate particles can penetrate into the valve bushing 3.

The weld can be provided by welding spots for example configured as a point cloud of welding spots. However, also one or plural weld seams are conceivable which can be arranged for example in a linear manner.

Advantageously the weld seam 42, 43, 44 is provided as a closed curve thus for example circular so that safe welding can be provided in case the weld extends beyond the end portion 39, 40, 41 by accident. This helps to provide a high level of process safety with respect to a tear off safety of the weld.

Figure 7:
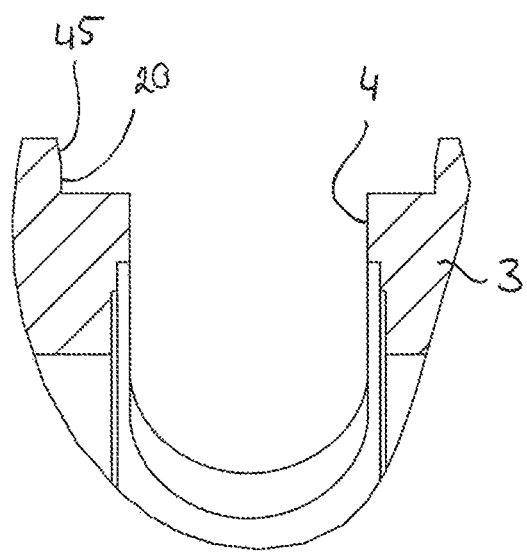
FIG. 7 illustrates a detail of the sectioned valve bushing of the hydraulic valve according to FIG. 1.
Figure 8:
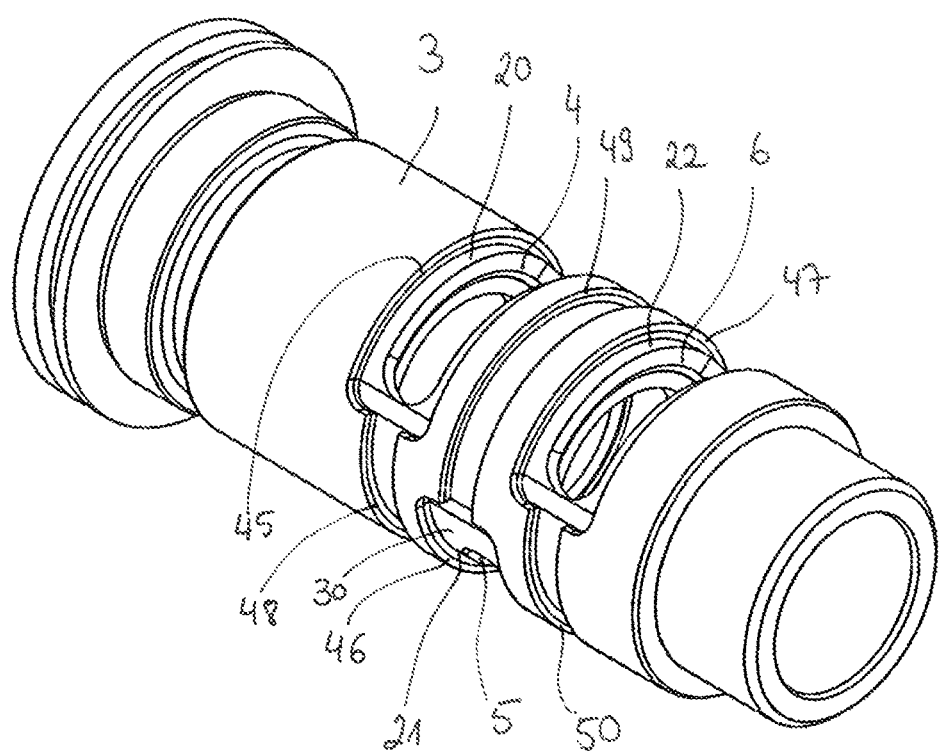
FIG. 8 illustrates the valve bushing of the hydraulic valve according to FIG. 1 in a perspective view.

As can be derived from FIG. 7 which illustrates an enlarged detail of the valve bushing 3 in the portion of the slotted holes 4 in a longitudinal sectional view a respective bevel 45, 46, 47 for facilitating assembly of the screen element 14 is provided in the first groove 20, 21, 22. By the same token the second grooves 35, 36, 37 respectively include a bevel 48, 49, 50.

Through an offset arrangement of the slotted holes 4, 5, 6, the arrangement of the welds in the filter masks 23, 24, 25 and the narrow configuration of the support bands 32, 33, 34 it is possible to provide a hydraulic valve 1 that is configured extremely short. It is even possible that two first grooves 20, 21, or 21, 22 that are arranged adjacent to each other are arranged with an axial overlap.

The filter portions 17, 18 19 are producible for example by an etching process in which small holes are etched out in a predetermined portion of the filter mask 23, 24, 25 The filter portions 17, 18, 19 are respectively enveloped by a thin edge 51, 52, 53 for having the filter mask 23, 24 25 contact in the groove 20, 21, 22.

The cartridge valve can be used in particular for adjusting a cam phaser. Thus, the cartridge valve can be arranged outside of the cam phaser. By the same token the cartridge valve can also be inserted into a rotor hub of the cam phaser. This is a so called central valve.

When used in conjunction with a cam phaser the cartridge valve supplies the hydraulic fluid from the supply connection P and from the two operating connections A, B. In order to pivot the cam phaser the hydraulic fluid is run from the supply connection P onto a first operating connection A or B, whereas the other operating connection B or A is relieved towards the tank drain T. This tank drain T can be run out for example in an axial direction at the first and/or the second end of the cartridge valve.

The described embodiments are only exemplary embodiments. A combination of the described features to provide different embodiments is also possible. Additional in particular non-described features of the device elements associated with the invention can be derived from geometries of the device component illustrated in the drawing figures.

What is claimed is:

1. A hydraulic valve, comprising:
a valve piston that is supported axially movable in a valve bushing and by which one or two operating connections are alternatively connectable with a supply connection or a tank drain,
wherein the one or two operating connections and the supply connection are each configured with respect to a longitudinal axis of the valve bushing as a slotted hole that extends over a portion of a circumference of the valve bushing and which is protected by a screen element configured as a metal band which covers the slotted hole with a filter portion,
wherein the screen element is arranged in a first groove enveloping the slotted hole and the screen element envelops the valve bushing in a second groove that extends from the first groove on two sides,
wherein the screen element includes a filter mask which includes a filter portion and includes a welding portion at a first end,
wherein the filter mask including the filter portion and the welding portion is arranged in the first groove and has a constant width with respect to the longitudinal axis of the valve bushing,
wherein the welding portion is arranged in a groove portion of the first groove outside of the slotted hole and a support band extends from a second end of the filter mask,
wherein the support band has a constant width and is narrower than the filter mask with respect to the longitudinal axis of the valve bushing and extends from a second end of the filter mask,
wherein the support band is arranged in the second groove and envelops the valve bushing, and
wherein an end portion of the support band at least partially covers the welding portion of the filter mask and is welded together with the welding portion.

2. The hydraulic valve according to claim 1, wherein the end portion of the support band is arranged on the welding portion and welded thereon.

3. The hydraulic valve according to claim 1, wherein the end portion of the support band is arranged under the welding portion and welded thereon.

4. The hydraulic valve according to claim 1, wherein a weld in the welding portion is provided through weld spots.

5. The hydraulic valve according to claim 1, wherein a weld in the welding portion is provided as at least one weld seam.

6. The hydraulic valve according to claim 5, wherein the at least one weld seam is provided linear.

7. The hydraulic valve according to claim 5, wherein the at least one weld seam is provided as a closed curve.

8. The hydraulic valve according to claim 7, wherein the at least one weld seam is provided circular.

9. The hydraulic valve according to claim 1, wherein the second groove has a larger diameter than the first groove and a seamless or tangential transition is provided between the first groove and the second groove.

10. The hydraulic valve according to claim 9, wherein the valve bushing is provided as a turned component and the first groove is provided milled and the second groove is provided turned.

11. The hydraulic valve according to claim 1, wherein plural slotted holes that form the one or two operating connections and the supply connection and that are arranged in an axial sequence with respect to the longitudinal axis of the valve bushing are arranged circumferentially offset from each other.

* * * * *